US012657109B2

(12) United States Patent
Bui et al.

(10) Patent No.: US 12,657,109 B2
(45) Date of Patent: Jun. 16, 2026

(54) SYSTEMS AND METHODS FOR A PROGRAM DEBUGGING FRAMEWORK

(71) Applicant: Salesforce, Inc., San Francisco, CA (US)

(72) Inventors: Nghi Bui, Singapore (SG); Yue Wang, Singapore (SG); Chu Hong Hoi, Singapore (SG)

(73) Assignee: Salesforce, Inc., San Francisco, CA (US)

( * ) Notice: Subject to any disclaimer, the term of this patent is extended or adjusted under 35 U.S.C. 154(b) by 664 days.

(21) Appl. No.: 18/047,175

(22) Filed: Oct. 17, 2022

(65) Prior Publication Data

US 2024/0134773 A1     Apr. 25, 2024

(51) Int. Cl.
G06F 11/3604     (2025.01)
G06F 8/65     (2018.01)
G06N 3/047     (2023.01)
G06N 3/084     (2023.01)

(52) U.S. Cl.
CPC ............ G06F 11/3608 (2013.01); G06F 8/65 (2013.01); G06N 3/047 (2023.01); G06N 3/084 (2013.01)

(58) Field of Classification Search
CPC ....... G06F 11/3608; G06F 8/65; G06N 3/047; G06N 3/084
See application file for complete search history.

(56) References Cited

U.S. PATENT DOCUMENTS

| | | | | |
|---|---|---|---|---|
| 11,048,887 | B1* | 6/2021 | Gupta | .................... G06N 3/045 |
| 11,256,562 | B2* | 2/2022 | Das | ........................ B64D 45/00 |
| 11,664,130 | B2* | 5/2023 | Tadesse | ................ G16H 50/20 |
| | | | | 705/2 |
| 2011/0087670 | A1* | 4/2011 | Jorstad | .................. G06F 40/284 |
| | | | | 707/E17.011 |
| 2018/0276562 | A1* | 9/2018 | Woulfe | .................. G06N 20/00 |
| 2021/0357762 | A1* | 11/2021 | Clement | ................ G06N 3/084 |
| 2021/0406266 | A1* | 12/2021 | Chan | ................... G06F 21/6245 |
| 2022/0269934 | A1* | 8/2022 | Song | ........................ G06N 5/041 |
| 2022/0398113 | A1* | 12/2022 | Choudhary | ............... G06F 8/65 |

OTHER PUBLICATIONS

NPL ("Sequencer: Sequence-to-Sequence Learning for End-to-End Program Repair", Chen et al., Sep. 9, 2019) (Year: 2019).*
Cure: Code-Aware Neural Machine Translation for Automatic Program Repair (Year: 2021).*
Cure: Code-Aware Neural Machine Translation for Automatic Program Repair, Jiang et al., May 7, 2021) (Year: 2021).*

* cited by examiner

*Primary Examiner* — Noor Alkhateeb
(74) *Attorney, Agent, or Firm* — Haynes and Boone, LLP

(57)     ABSTRACT

Embodiments described herein provide a unified debugging framework that adapts a pretrained programming language model for line-level debugging and repair. Specifically, the debugging framework follow the logic of programmers on how to debug their code. For example, the debugging framework first determines whether or not a function is buggy. If it is buggy, the debugging framework localizes the problematic line and provide a patch (repair).

20 Claims, 10 Drawing Sheets

Input Program Patch 111

```
1  public XMLElement toXML ( ) { [SEP]
2    XMLElement element = basicElement ("repeat") ; [SEP]
3    if (minCount > 0) { [SEP]
4      element.setAttribute ("minCount", minCount); [SEP]
5    } [SEP]
6    if (minCount != Integer.MAX_VALUE) { [SEP]
7      element.setAttribute ("maxCount", mixCount); [SEP]
8    } [SEP]
9    return element; [SEP]
10 } [SEP]
```

113  0 0 0 0 0 0 1 0 0 0
115  0 0 0 0 0 0 0 0 1

Localize    Detect

102    Encoder

Repair  104

Decoder 117    if (maxCount !=
       Integer.MAX_VALUE) {

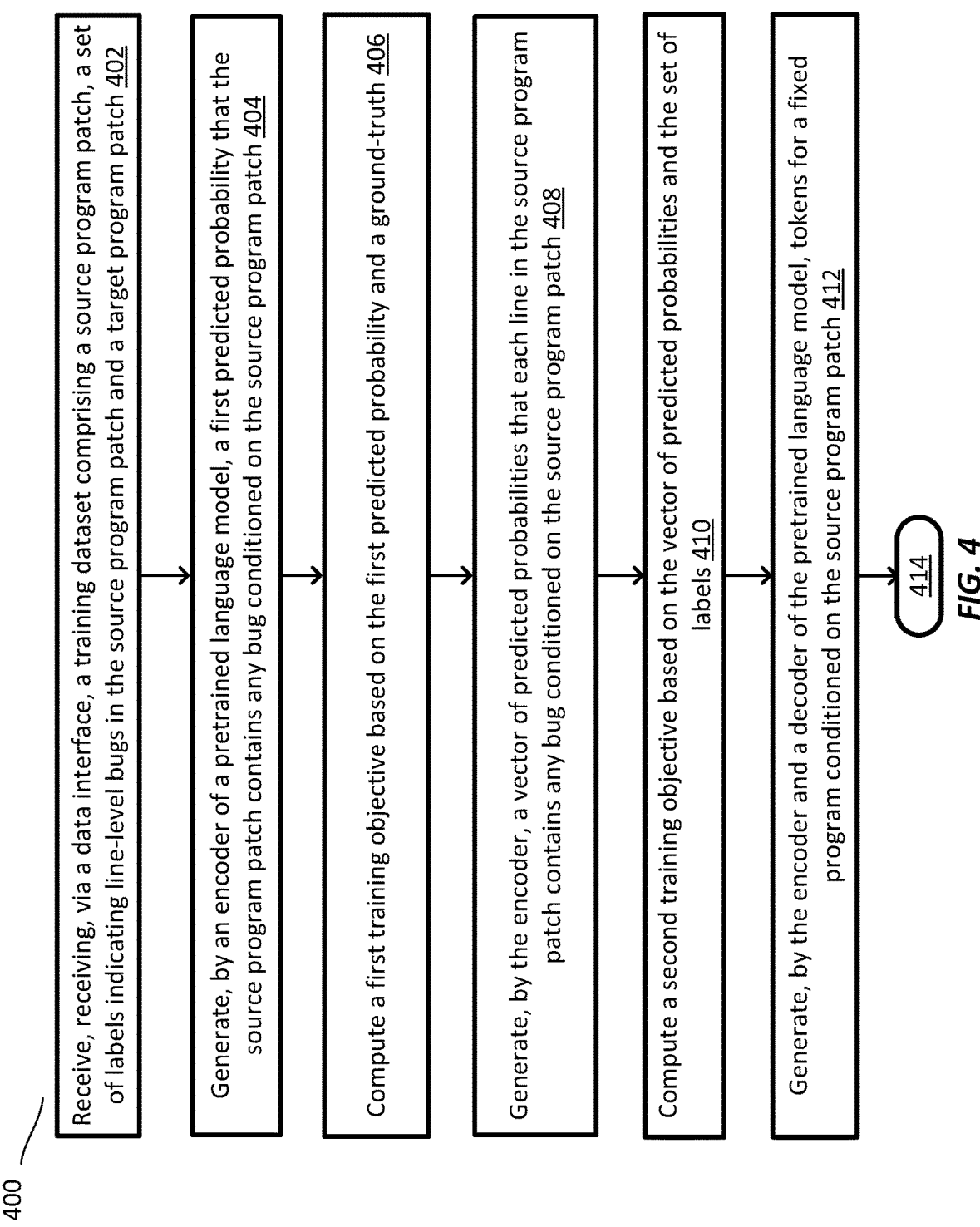

400

Receive, receiving, via a data interface, a training dataset comprising a source program patch, a set of labels indicating line-level bugs in the source program patch and a target program patch 402

Generate, by an encoder of a pretrained language model, a first predicted probability that the source program patch contains any bug conditioned on the source program patch 404

Compute a first training objective based on the first predicted probability and a ground-truth 406

Generate, by the encoder, a vector of predicted probabilities that each line in the source program patch contains any bug conditioned on the source program patch 408

Compute a second training objective based on the vector of predicted probabilities and the set of labels 410

Generate, by the encoder and a decoder of the pretrained language model, tokens for a fixed program conditioned on the source program patch 412

Compute a third training objective based on the tokens for the fixed program and the target program patch 414

Update the pretrained language model based on at least in part on the first, second and third training objectives via backpropagation 416

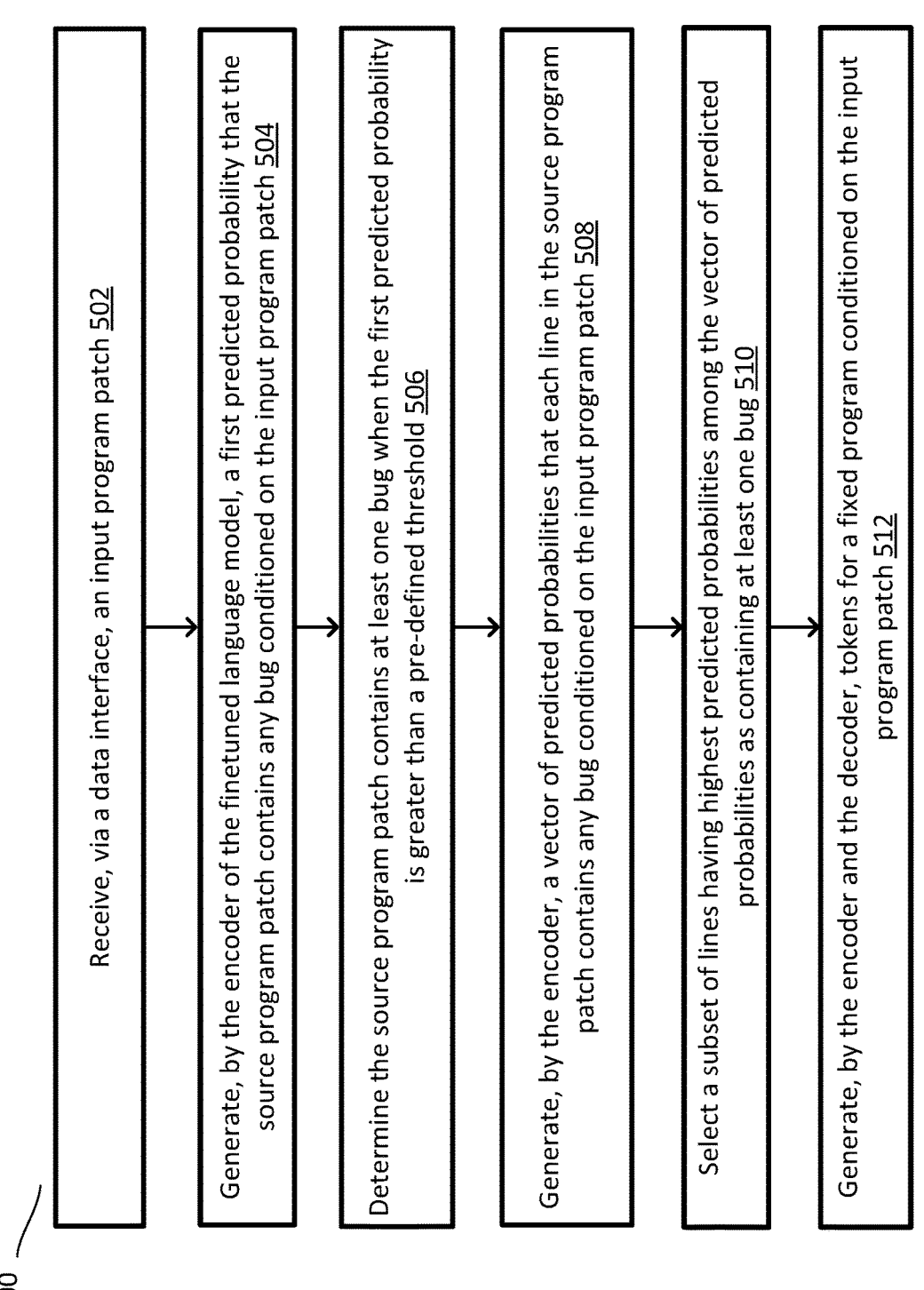

Receive, via a data interface, an input program patch 502

Generate, by the encoder of the finetuned language model, a first predicted probability that the source program patch contains any bug conditioned on the input program patch 504

Determine the source program patch contains at least one bug when the first predicted probability is greater than a pre-defined threshold 506

Generate, by the encoder, a vector of predicted probabilities that each line in the source program patch contains any bug conditioned on the input program patch 508

Select a subset of lines having highest predicted probabilities among the vector of predicted probabilities as containing at least one bug 510

Generate, by the encoder and the decoder, tokens for a fixed program conditioned on the input program patch 512

Table 1: Statistics of datasets

| Split | SL-Java | | ML-Python | |
|---|---|---|---|---|
| | #Projects | #Instances | #Projects | #Instances |
| Train | 2,348 | 52,780 | 4,428 | 132,243 |
| Val | 335 | 7,465 | 480 | 22,305 |
| Test | 700 | 15,250 | 867 | 35,457 |

FIG. 6

Table 2: Performance of function-level bug detection. ↑: the higher the better, ↓: the lower the better.

| Model | SL-Java | | ML-Python | |
|---|---|---|---|---|
| | F1↑ | FPR↓ | F1↑ | FPR↓ |
| SpotBugs | 4.6 | 89.29 | - | - |
| TBCNN | 45.49 | 38.03 | 51.24 | 48.20 |
| CodeBERT | 55.67 | 40.02 | 50.24 | 50.32 |
| GraphCodeBERT | 56.44 | 38.99 | 49.30 | 53.20 |
| PLBART | 59.01 | 35.21 | 52.33 | 51.24 |
| CodeT5-R | 50.94 | 40.29 | 52.93 | 46.45 |
| CodeT5-D | 59.28 | 34.32 | 52.93 | 46.45 |
| CodeT5-DLR | 63.46 | 31.24 | 54.83 | 43.21 |

FIG. 7

Table 3: Performance of line-level bug localization. ↑: the higher the better and ↓: the lower the better.

| Model | SL-Java | | | | ML-Python | | | |
|---|---|---|---|---|---|---|---|---|
| | MRR@1↑ | MRR@5↑ | FPR@1↓ | FPR@5↓ | MAP@1↑ | MAP@5↑ | FPR@1↓ | FPR@5↓ |
| DeepLineDP | 14.05 | 15.33 | 25.30 | 41.20 | 9.35 | 11.98 | 25.60 | 73.21 |
| LineVul | 15.34 | 16.79 | 23.59 | 39.45 | 10.46 | 14.24 | 27.46 | 67.22 |
| CodeBERT | 21.66 | 29.69 | 17.20 | 21.57 | 18.67 | 26.30 | 19.92 | 58.90 |
| GraphCodeBERT | 20.35 | 28.45 | 18.67 | 20.45 | 22.59 | 28.92 | 19.20 | 53.24 |
| PLBART | 23.02 | 30.98 | 12.93 | 14.67 | 23.22 | 30.56 | 13.98 | 46.22 |
| CodeT5-L | 24.40 | 32.01 | 7.33 | 10.39 | 24.59 | 32.40 | 13.67 | 42.44 |
| CodeT5-DLR | 26.78 | 34.67 | 3.04 | 8.05 | 26.98 | 33.75 | 9.84 | 38.46 |

FIG. 8

Table 4: Performance of Program Repair task.

| Model | SL-Java | | ML-Python | |
|---|---|---|---|---|
| | EM | BLEU | EM | BLEU |
| CodeBERT | 3.66 | 34.21 | 3.40 | 29.40 |
| GraphCodeBERT | 3.35 | 35.29 | 3.31 | 30.59 |
| PLBART | 6.02 | 40.12 | 5.39 | 33.92 |
| CodeT5-R | 7.30 | 40.20 | 6.01 | 35.54 |
| CodeT5-DLR | 10.30 | 43.42 | 6.30 | 38.44 |

SYSTEMS AND METHODS FOR A PROGRAM DEBUGGING FRAMEWORK

CROSS REFERENCES

The instant application is related to co-pending U.S. nonprovisional application Ser. No. 17/459,968, filed Aug. 27, 2021, which is hereby expressly incorporated herein by reference in its entirety.

TECHNICAL FIELD

The embodiments relate generally to machine learning systems for program synthesis and debugging, and more specifically to systems and methods for a unified framework for program bug detection, localization and program repair.

BACKGROUND

Program synthesis, also commonly referred to as code generation, is a task to generate a computer code program that satisfies a problem specification, e.g., sorting a list, merging two data tables, and/or the like. While recent program synthesis model such as CodeT5 (described in commonly-owned and co-pending U.S. nonprovisional application Ser. No. 17/459,968) improves the accuracy and efficiency of code generation, program debugging mostly relies on manual labor, which remains costly and time-consuming. Specifically, program debugging is the process of localizing erroneous lines of a program (bug localization) and fixes this buggy patch (program repair).

Therefore, there is a need for an efficient and accurate program synthesis model.

BRIEF DESCRIPTION OF THE DRAWINGS

FIG. 5 is an example logic flow diagram illustrating a method of using the unified debugging framework to fix an input program patch, according to some embodiments described herein.

FIG. 6 is a table of example statistics of the two code debugging datasets, according to some embodiments described herein.

FIG. 7 is a table showing example performance of function-level bug detection of the debugging framework comparing with baseline models, according to some embodiments described herein.

FIG. 8 is a table showing example performance of line-level bug localization of the debugging framework comparing with baseline models, according to some embodiments described herein.

Figure 1A:
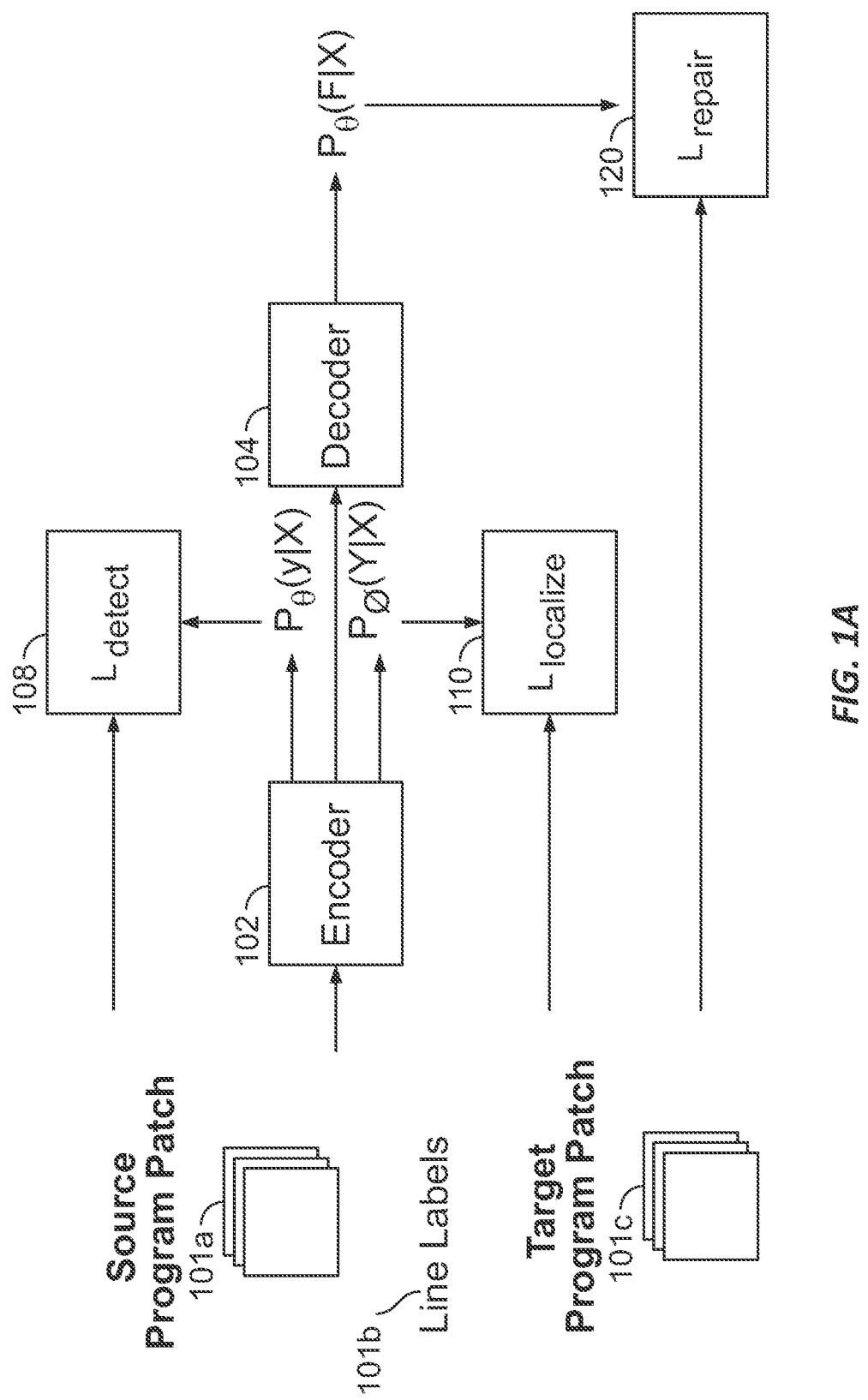
FIG. 1A is a simplified block diagram illustrating an example architecture of the debugging framework that jointly trains an encoder-decoder structure for bug detection, localization and repair, according to embodiments described herein.

In the figures, elements having the same designations have the same or similar functions.

DETAILED DESCRIPTION

As used herein, the term "network" may comprise any hardware or software-based framework that includes any artificial intelligence network or system, neural network, or system and/or any training or learning models implemented thereon or therewith.

As used herein, the term "module" may comprise hardware or software-based framework that performs one or more functions. In some embodiments, the module may be implemented on one or more neural networks.

Program debugging is the process of localizing erroneous lines of a program (bug localization) and fixes this buggy patch (program repair). Existing debugging tools are often program analysis based or neural-based. For example, a program analysis-based tool may employ compiler based and software engineering theory to build code analysis tools. These tools are hardly not scalable to large and complicated programs due to the increasing computational overhead for analyzing codes.

On the other hand, a neural-based model may train neural networks to automatically acquire bug-fix patterns through learning from a massive corpora of previous bug-fix data. These existing neural-based techniques are often limited in a few aspects. First, code-specific or language-specific features such as control flow, data flow, and abstract syntax trees (ASTs) are often employed in such techniques, which requires a significant amount of engineering effort for a careful design of code representations. This design effort largely limits their applicability to more diverse domains or programming languages. Second, existing models often focus on bug detection at coarse-grained code granularity such as function level or file level, which has been shown to be impractical in real-world use. Bug localization at an overly fine-grained level such as the token level may often yield inaccuracy, such as false positives. In addition, existing line-level or statement-level bug localization, although might obviate some issues associated with fine-grained level bug localization, often requests the execution of test cases in order to complete the bug localization process. The execution may often consumer significant computational resource, and may not be scalable when the program increases in size and complexity.

In view of the deficiencies in existing program debugging tools, embodiments described herein provide a unified debugging framework that adapts a pretrained programming language model for line-level debugging and repair. Specifically, the debugging framework follow the logic of programmers on how to debug their code. For example, the debugging framework first determines whether or not a function is buggy. If it is buggy, the debugging framework localizes the problematic line and provide a patch (repair).

In one embodiment, pretrained language models are used for code debugging. The pretrained language models treat input code programs as a natural language input, which reduces the effort of the code representation engineering process. Second, the pretrained knowledge gained from large number of source code can be leveraged. For example, CodeT5, which is pretrained on large-scale code corpus collected from Github using code-aware objectives, may be employed as the foundation model.

To achieve the debugging process, the pretrained language models are fine-tuned with three fine-tuning objectives. The first objective fine-tunes the pretrained language model for a function-level bug detection task. For instance, the pretrained language model is fine-tuned to determine whether a particular piece of code includes a bug. The second objective fine-tune the pretrained language model to identify (localize) the exact lines of code that include bugs. The third objective fine-tunes the pretrained language model for program repair. For example, the pretrained language model is trained to convert the buggy code to the correct code (if applicable).

In this way, the pretrained language model may be updated based on a combination of the three objectives to achieve bug detection, localization and program repair within one unified model. These tasks complement one another and culminate in a robust, all-encompassing debugging tool capable of doing many debugging-related tasks.

Overview

FIG. 1A is a simplified block diagram illustrating an example architecture of the debugging framework 100 that jointly trains an encoder-decoder structure for bug detection, localization and repair, according to embodiments described herein. As shown in FIG. 1, the debugging framework 100 is built upon a pretrained language model, which in turn comprises an encoder 102 and a decoder 104. The debugging framework 100 jointly address three tasks in program debugging: bug detection (whether a given code snippet contains bugs), bug localization (which lines are buggy), and program repair (how to repair bugs).

In one embodiment, the encoder 102 may receive an input program code 101. For example, at training stage the input program code 101 may be supplied from a program debugging dataset, denoted by $\mathcal{D}$ which in turn comprises $|\mathcal{D}|$ triplets of debugging program samples (X, Y, F). X denotes the source program patch 101a at function level; Y= $\{y_1, \ldots, y_L\}$ denotes the buggy label 101b for each line of code, where $y_i \in [0,1]$ is a binary label representing whether the i-th line is buggyinf or not; L denotes the number of lines in the source program path X; and F denotes the target fixed program 101c if the source patch X contains any buggy lines, otherwise F is an empty string. For each X, y denotes such function-level binary label and y=1 if there exists $y_i$=1 and else y=0.

In one embodiment, the input program code 101a may take an input format in which a special token [SEP] is inserted for each line in X to inform the end of line information.

In one embodiment, the encoder 102 and decoder 104 may be those from a pretrained encoder-decoder language model for code generation, such as CodeT5. For example, CodeT5 was pretrained on a large-scale source code corpus collected from Github which consists of 8 different programming languages (including Java and Python). Thus, similar to the encoder of CodeT5, the encoder 102 may employ a code-specific Byte-Pair Encoding (BPE) tokenizer that is able to avoid Out-of-Vocabulary (OoV) problems.

For function-level bug detection, the debugging framework 100 is fine-tuned to detect whether a function contains any bugs. Given an input code patch X 101, the debugging framework 100 generates a binary probability of $P_\theta(y|X)$ based on the encoder 102 and decoder 104 parameterized by CodeT5 pretrained parameters θ. Specifically, the encoder 102 may receive and encode the source patch X 101 by adopting the last encoder state as the sequence representation of X, followed by a linear layer on top of it for a binary classification.

In one implementation, a detection training objective may be computed as a cross entropy loss (denoted as $\mathcal{L}_{detect}$) 108 in training. For example, $\mathcal{L}_{detect}$ is computed as a cross entropy between the distribution $P_\theta(y|X)$ with the ground-truth Y corresponding to the input patch X.

In addition to bug detection, the encoder 102 further localizes which exact lines of the input patch X are buggy. The encoder 102 may then compute a probability $P_\phi(Y|X)$, where $\phi$ denotes the parameter of the encoder 102. Specifically, the encoder 102 may gather the last layer states of all [SEP] tokens in the encoder and map them to a vector of probabilities $\hat{Y}=\{\hat{y}_1, \ldots, \hat{y}_L\}$. For example, the bug localization task may be formulated as a sequence labeling task. The encoder 102 in turn generates sequence labels $\hat{Y}$ in response to an input sequence 101 of lines of codes. A binary cross entropy loss 110 (denoted as $\mathcal{L}_{localize}$) may be computed between $\hat{Y}$ and Y during training.

In one embodiment, the encoder-decoder framework 100 further implements a program repair task that translates the bugging source patch X 101 into a fixed version F. Specifically, the decoder 104 may generate a probability $$P_\theta(F|X) = \prod_{j=1}^{n} P_\theta(Y_j|X, F_1:F_j - 1),$$

where $F_1:F_j-1$ is the previous sequence before the j-th token and n denotes the number of tokens in the target sequence F.

At training stage, the program repair task can be formulated as a sequence-to-sequence problem, e.g., the decoder 104 generates the sequence of the "repaired" program token by token. The generated "repaired" program can then be compared with the ground-truth target sequence F corresponding to X to compute a sequence generation loss 120 (denoted as $\mathcal{L}_{repair}$).

Thus, during training, the framework 100 may implement multi-task learning to simultaneously optimize these three tasks by combining their losses in an end-to-end manner:

$$\mathcal{L} = \mathcal{L}_{detect} + \mathcal{L}_{localize} + \mathcal{L}_{repair}$$

Then, the parameter θ of the encoder 102 and the decoder 104 may be updated based on the combined loss $\mathcal{L}$ via backpropagation.

In this way, by jointly training the unified framework 100 using the combined loss, these tasks of bug detection, bug localization and program repair may complement to each other. For instance, a precise bug locator can better inform the repairer with bug location to aid the bug fixing.

Figure 1B:
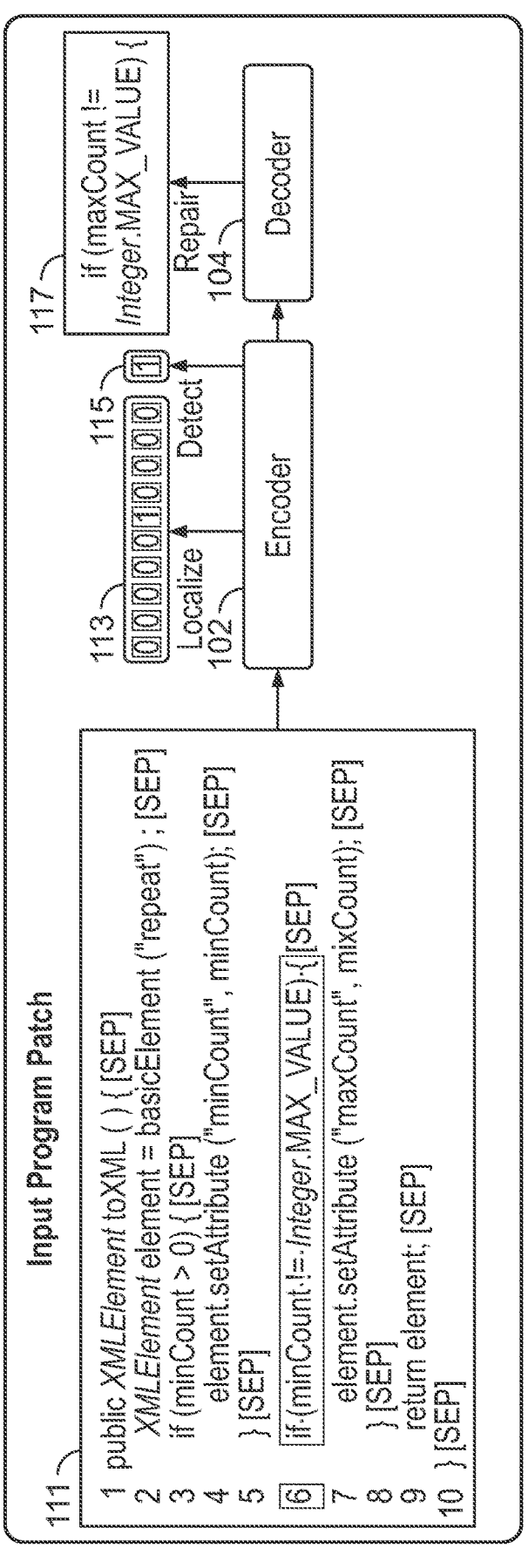
FIG. 1B is a simplified block diagram illustrating the debugging framework implementing joint tasks of bug detection, localization and repair at inference stage, according to embodiments described herein.

FIG. 1B is a simplified block diagram illustrating the debugging framework 100 implementing joint tasks of bug detection, localization and repair at inference stage, according to embodiments described herein. For example, at inference stage, in response to an input program patch 111, the encoder 102 may generate a distribution of a binary sequence representation 115. The source patch 111 is considered as buggy if the predicted probability is higher than a threshold (e.g., 0.5, 0.55, etc.), e.g., a binary representation of 1.

At inference (testing) stage, the top-k predictions of bug localizations are obtained from the predicted probabilities $P_\phi(Y|X)$ in response to an input source patch 111. For example, a testing input source patch 111 may contain only one single buggy line or multiple buggy lines. For testing purposes, the top-K predictions are measured as to how they match the ground truth with retrieval metrics. A localization intermediate output 113 may be generated as a vector of binary values, with 1 indicating the corresponding line contains a bug.

At inference, after the decoder 104 generates an output probability distribution of tokens for the repaired program, beam search may be adopted to generate a ranked list of fixed candidate patches from the decoder output. The highest ranked candidate may be output as the fixed program 117.

Computer Environment

Figure 2:
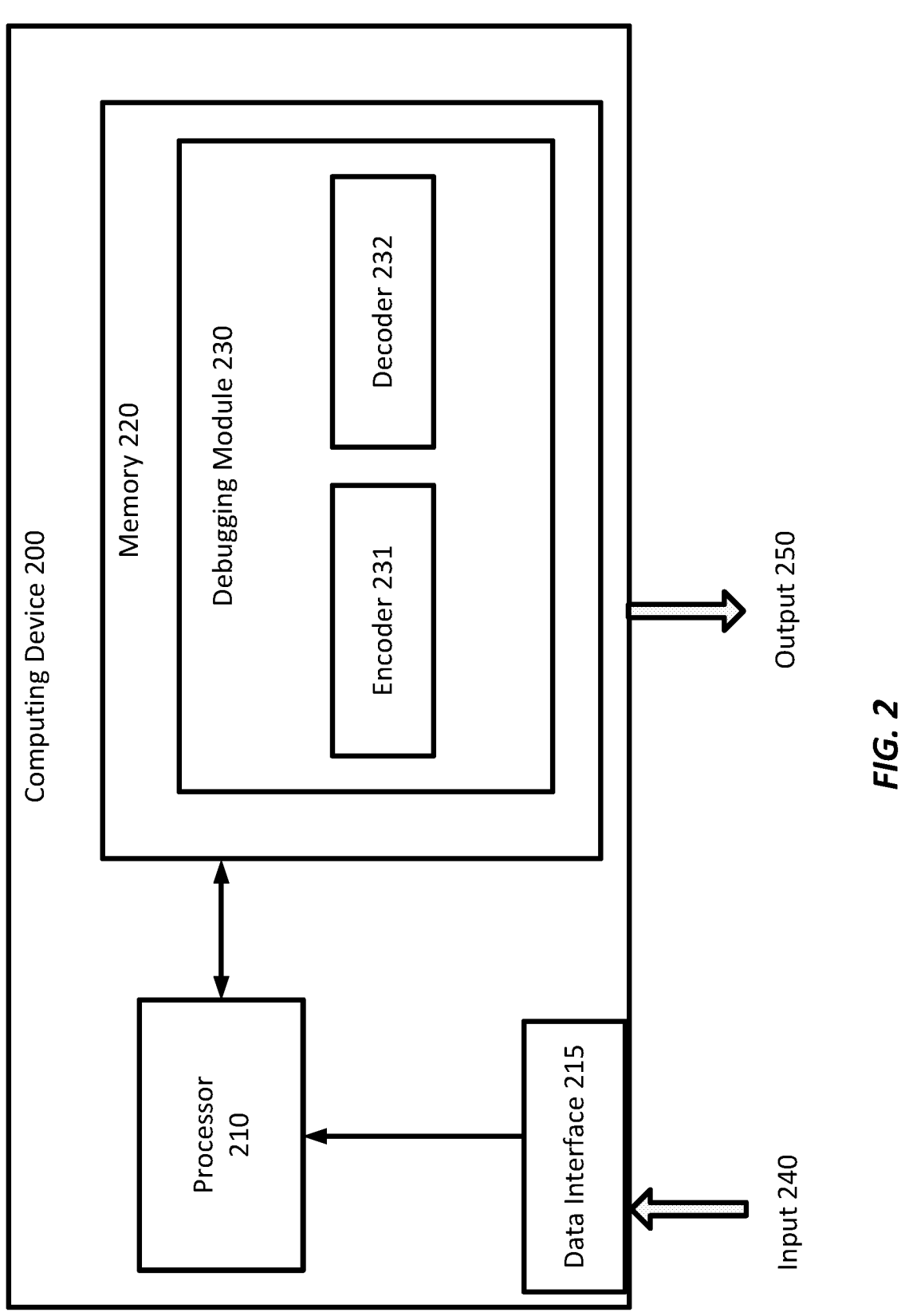
FIG. 2 is a simplified diagram of a computing device for implementing the debugging framework 100 shown in FIGS. 1A-1B, according to some embodiments.

FIG. 2 is a simplified diagram of a computing device 200 for implementing the debugging framework 100 shown in FIGS. 1A-1B, according to some embodiments. As shown in FIG. 2, computing device 200 includes a processor 210 coupled to memory 220. Operation of computing device 200 is controlled by processor 210. And although computing device 200 is shown with only one processor 210, it is understood that processor 210 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 200. Computing device 200 may be implemented as a stand-alone subsystem, as a board added to a computing device, and/or as a virtual machine.

Memory 220 may be used to store software executed by computing device 200 and/or one or more data structures used during operation of computing device 200. Memory 220 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip, or cartridge, and/or any other medium from which a processor or computer is adapted to read.

Processor 210 and/or memory 220 may be arranged in any suitable physical arrangement. In some embodiments, processor 210 and/or memory 220 may be implemented on a same board, in a same package (e.g., system-in-package), on a same chip (e.g., system-on-chip), and/or the like. In some embodiments, processor 210 and/or memory 220 may include distributed, virtualized, and/or containerized computing resources. Consistent with such embodiments, processor 210 and/or memory 220 may be located in one or more data centers and/or cloud computing facilities.

In some examples, memory 220 may include non-transitory, tangible, machine readable media that includes executable code that when run by one or more processors (e.g., processor 210) may cause the one or more processors to perform the methods described in further detail herein. For example, as shown, memory 220 includes instructions for a debugging module 230 that may be used to implement and/or emulate the systems and models, and/or to implement any of the methods described further herein. A debugging module 230 may receive input 240 that includes a source code patch (e.g., 101 in FIGS. 1A-1B) via the data interface 215 and generate a fixed patch (e.g., 117 in FIG. 1B) as output 250.

In some embodiments, the debugging model 230 includes an encoder module 231 (e.g., 102 in FIGS. 1A-1B) and a decoder module 232 (e.g., 104 in FIGS. 1A-1B). Details of the debugging module 230 and its submodule 231-232 and their interactions are discussed in relation to encoder 102 and decoder 104 in FIGS. 1A-1B and flow diagrams in FIGS. 4-5.

In one embodiment, the debugging module 230 and its submodule 231-232 may be implemented by hardware, software and/or a combination thereof.

Some examples of computing devices, such as computing device 200 may include non-transitory, tangible, machine readable media that include executable code that when run by one or more processors (e.g., processor 210) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 3:
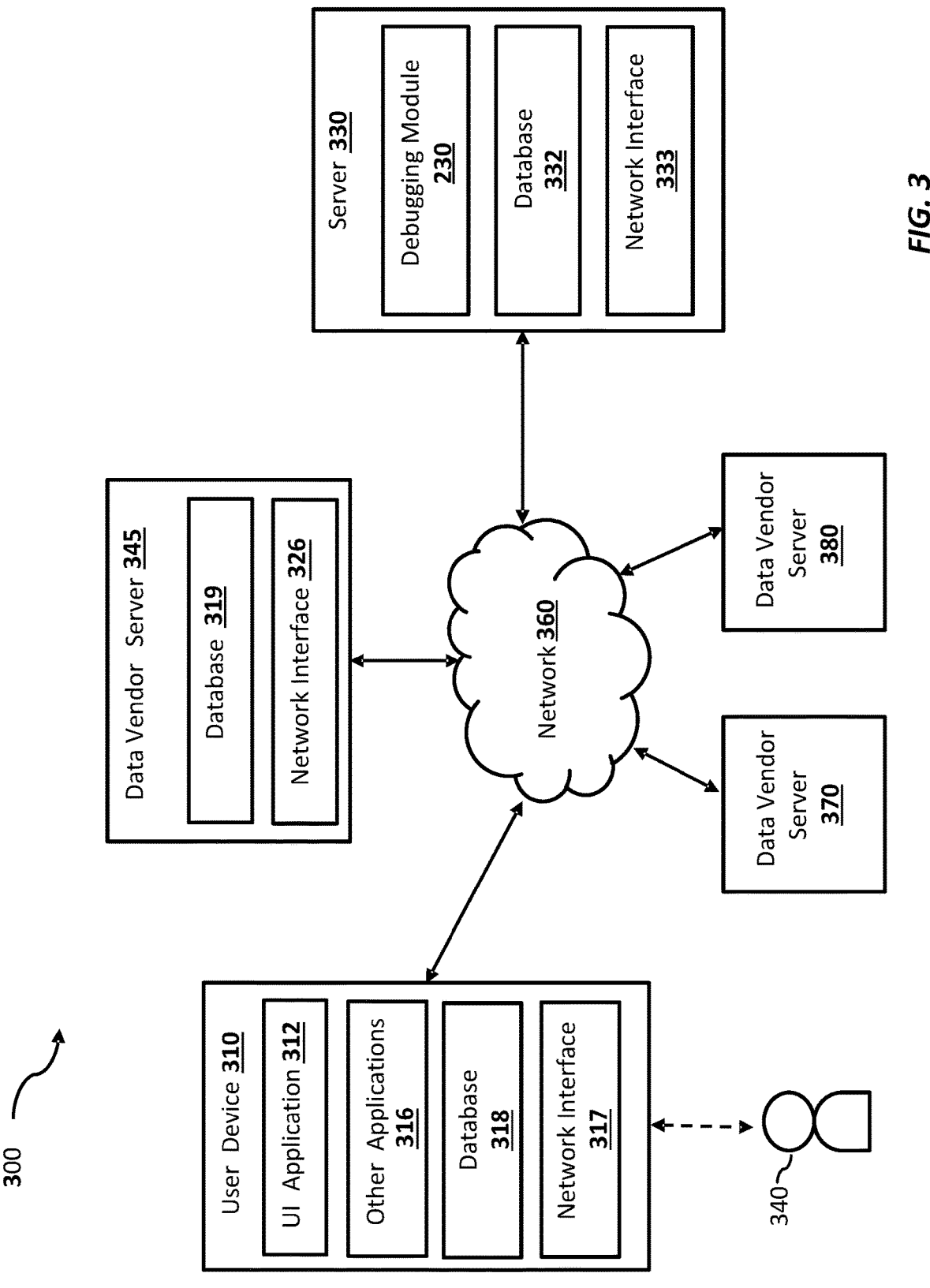
FIG. 3 is a simplified block diagram of a networked system suitable for implementing the debugging framework described in FIGS. 1A-1B and other embodiments described herein.

FIG. 3 is a simplified block diagram of a networked system suitable for implementing the debugging framework described in FIGS. 1A-1B and other embodiments described herein. In one embodiment, block diagram 300 shows a system including the user device 310 which may be operated by user 340, data vendor servers 345, 370 and 380, server 330, and other forms of devices, servers, and/or software components that operate to perform various methodologies in accordance with the described embodiments. Exemplary devices and servers may include device, stand-alone, and enterprise-class servers which may be similar to the computing device 100 described in FIG. 1, operating an OS such as a MICROSOFT® OS, a UNIX® OS, a LINUX® OS, or other suitable device and/or server-based OS. It can be appreciated that the devices and/or servers illustrated in FIG. 3 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 310, data vendor servers 345, 370 and 380, and the server 330 may communicate with each other over a network 360. User device 310 may be utilized by a user 340 (e.g., a driver, a system admin, etc.) to access the various features available for user device 310, which may include processes and/or applications associated with the server 330 to receive an output data anomaly report.

User device 310, data vendor server 345, and the server 330 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 300, and/or accessible over network 360.

User device 310 may be implemented as a communication device that may utilize appropriate hardware and software configured for wired and/or wireless communication with data vendor server 345 and/or the server 330. For example, in one embodiment, user device 310 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 310 of FIG. 3 contains a user interface (UI) application 312, and/or other applications 316, which may correspond to executable processes, procedures, and/or applications with associated hardware. For example, the user device 310 may receive a message indicating the repaired program from the server 330 and display the message via the UI application 312. In other embodiments, user device 310 may include additional or different modules having specialized hardware and/or software as required.

In various embodiments, user device 310 includes other applications 316 as may be desired in particular embodiments to provide features to user device 310. For example, other applications 316 may include security applications for implementing client-side security features, programmatic client applications for interfacing with appropriate application programming interfaces (APIs) over network 360, or other types of applications. Other applications 316 may also include communication applications, such as email, texting, voice, social networking, and IM applications that allow a user to send and receive emails, calls, texts, and other notifications through network 360. For example, the other application 316 may be an email or instant messaging application that receives a message from the server 330. Other applications 316 may include device interfaces and other display modules that may receive input and/or output information. For example, other applications 316 may contain software programs for asset management, executable by a processor, including a graphical user interface (GUI) configured to provide an interface to the user 340 to view generated program.

User device 310 may further include database 318 stored in a transitory and/or non-transitory memory of user device 310, which may store various applications and data and be utilized during execution of various modules of user device 310. Database 318 may store user profile relating to the user 340, predictions previously viewed or saved by the user 340, historical data received from the server 330, and/or the like. In some embodiments, database 318 may be local to user device 310. However, in other embodiments, database 318 may be external to user device 310 and accessible by user device 310, including cloud storage systems and/or databases that are accessible over network 360.

User device 310 includes at least one network interface component 319 adapted to communicate with data vendor server 345 and/or the server 330. In various embodiments, network interface component 319 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 345 may correspond to a server that hosts one or more of the databases 303*a-n* (or collectively referred to as 303) to provide training datasets including public code data to the server 330. The database 303 may be implemented by one or more relational database, distributed databases, cloud databases, and/or the like.

The data vendor server 345 includes at least one network interface component 326 adapted to communicate with user device 310 and/or the server 330. In various embodiments, network interface component 326 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 345 may send asset information from the database 303, via the network interface 326, to the server 330.

The server 330 may be housed with the debugging module 230 and its submodules described in FIG. 2. In some implementations, debugging module 230 may receive training code data from database 319 at the data vendor server 345 via the network 360 to generate programs. The generated fixed programs may also be sent to the user device 310 for review by the user 340 via the network 360.

The database 332 may be stored in a transitory and/or non-transitory memory of the server 330. In one implementation, the database 332 may store data obtained from the data vendor server 345. In one implementation, the database 332 may store parameters of the program synthesis model 630. In one implementation, the database 332 may store previously generated programs and problem descriptions, and the corresponding input feature vectors.

In some embodiments, database 332 may be local to the server 330. However, in other embodiments, database 332 may be external to the server 330 and accessible by the server 330, including cloud storage systems and/or databases that are accessible over network 360.

The server 330 includes at least one network interface component 333 adapted to communicate with user device 310 and/or data vendor servers 345, 370 or 380 over network 360. In various embodiments, network interface component 333 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 360 may be implemented as a single network or a combination of multiple networks. For example, in various embodiments, network 360 may include the Internet or one or more intranets, landline networks, wireless networks, and/or other appropriate types of networks. Thus, network 360 may correspond to small scale communication networks, such as a private or local area network, or a larger scale network, such as a wide area network or the Internet, accessible by the various components of system 300.

Example Workflows

Figure 4:
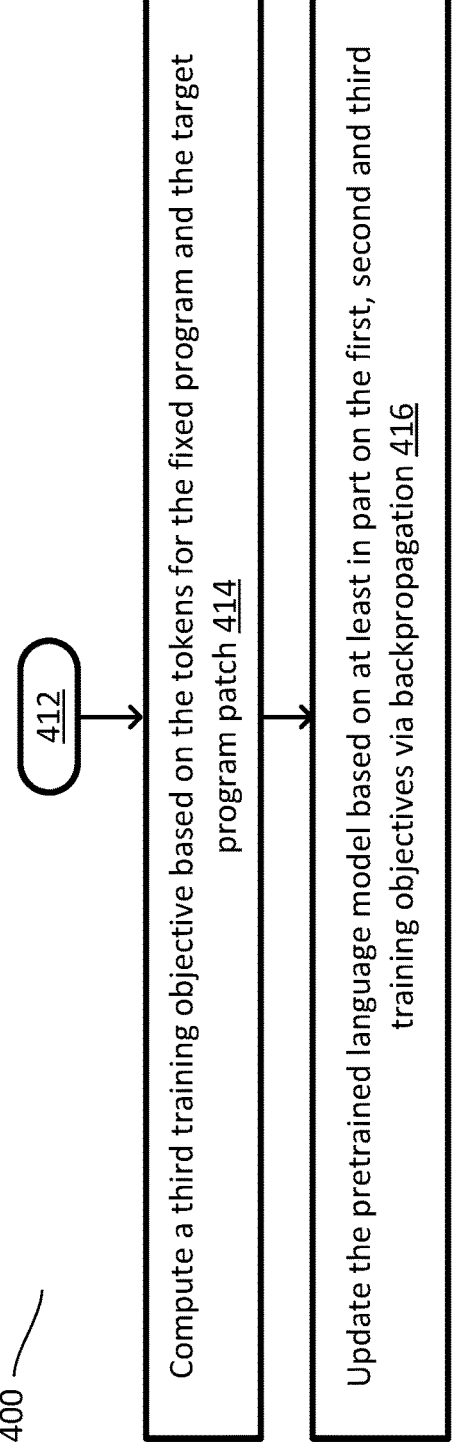
FIG. 4 is an example logic flow diagram illustrating a method of training the unified debugging framework shown in FIG. 1A, according to some embodiments described herein.

FIG. 4 is an example logic flow diagram illustrating a method of training the unified debugging framework 100 shown in FIG. 1A, according to some embodiments described herein. One or more of the processes of method

400 may be implemented, at least in part, in the form of executable code stored on non-transitory, tangible, machine-readable media that when run by one or more processors may cause the one or more processors to perform one or more of the processes. In some embodiments, method 400 corresponds to the operation of the debugging module 230 (e.g., FIGS. 2-3).

At step 402, a training dataset comprising a source program patch, a set of labels indicating line-level bugs in the source program patch and a target program patch may be received, via a data interface (e.g., 215 in FIG. 2).

At step 404, an encoder (e.g., 102 in FIG. 1A) of a pretrained language model may generate a first predicted probability that the source program patch contains any bug conditioned on the source program patch. For example, the first predicted probability is generated based on a last encoder state of the encoder.

At step 406, a first training objective (e.g., a cross-entropy loss) is computed based on the first predicted probability and a ground-truth.

At step 408, the encoder may generate a vector of predicted probabilities that each line in the source program patch contains any bug conditioned on the source program patch. For example, the vector of predicted probabilities are generated based on last layer states of all special tokens inserted into the source program patch in the encoder.

At step 410, a second training objective (e.g., a cross-entropy loss) may be computed based on the vector of predicted probabilities and the set of labels.

At step 412, the encoder and the decoder of the pretrained language model may generate tokens for a fixed program conditioned on the source program patch. For example, the tokens for the fixed program are generated as a sequence to sequence generation based on an input sequence of tokens in the source program patch.

At step 414, a third training objective (e.g., a cross-entropy loss) may be computed based on the tokens for the fixed program and the target program patch.

At step 416, the pretrained language model may be updated based on at least in part on the first, second and third training objectives via backpropagation. For example, the pretrained language model is updated based on a sum of the first, the second and the third training objectives; or at least one of, or a sum of any two of the first, the second and the third training objectives.

FIG. 5 is an example logic flow diagram illustrating a method of using the unified debugging framework 100 to fix an input program patch, according to some embodiments described herein. One or more of the processes of method 500 may be implemented, at least in part, in the form of executable code stored on non-transitory, tangible, machine-readable media that when run by one or more processors may cause the one or more processors to perform one or more of the processes. In some embodiments, method 500 corresponds to the operation of the debugging module 230 (e.g., FIGS. 2-3).

At step 502, an input program patch may be received, e.g., via a data interface (e.g., 215 in FIG. 2).

At step 504, an encoder (e.g., 102 in FIG. 1A) of the finetuned language model (finetuned by method 400) may generate a first predicted probability that the source program patch contains any bug conditioned on the source program patch.

At step 506, the encoder may determine the input program patch contains at least one bug when the first predicted probability is greater than a pre-defined threshold. For example, a linear layer may be applied on the first predicted probability for a binary classification.

At step 508, the encoder may generate a vector of predicted probabilities that each line in the input program patch contains any bug conditioned on the input program patch.

At step 510, a subset of lines (e.g., top-K) may be selected as having highest predicted probabilities among the vector of predicted probabilities as containing at least one bug.

At step 512, the decoder of the pretrained language model may generate tokens for a fixed program conditioned on the input program patch. For example, the decoder may generate via beam search, a ranked list of fixed candidate patches from a decoder output distribution. In this way, a top ranked fixed candidate patch may be selected as an output fixed program.

Example Data Experiments

Two new datasets are built for the example data experiments for the debugging framework 100. One is the single line bug-fixes pair and the other is the multi-line bug-fixes pair. The single line bug-fixes (described in Karampatsis et al., How often do single-statement bugs occur? the manysstubs4j dataset, in Proceedings of the 17th International Conference on Mining Software Repositories, pages 573-577, 2020) have been considered recently as one of the major issues that affects the quality of source code. These bugs can be fixed easily with simple code changes such as changing operators, renaming identifiers, swapping variables and so on. However, these bugs occurred frequently, and current static-based techniques are incapable of detecting them accurately (less than 10% in accuracy).

Most existing datasets, however, are not suitable for our purpose due to three reasons: (1) they contain only the code changes at the file level while our goal is to detect buggy lines at both function level and line level; (2) they does not contain the before and after function-level information of the code changes but only the patches at line-level; and (3) these datasets are mostly for single-line bug fixes, while our goal is to extend for a more realistic setting of multi-line bugs.

Two datasets are thus collected in Java and Python. Concretely, bug-fixes code changes are extracted from Github commit. To decide if a commit fixes a bug, the method described in Karampatsis et al. is adopted to check if its commit message contains at least one of the keywords: error, bug, fix, issue, mis-take, incorrect, fault, defect, flaw, and type. This heuristic has been shown to achieve 96% accuracy on a set of 300 manually verified commits and 97.6% on a set of 384 manually verified commits.

The code changes are made up of three parts of a source file: before changes, after changes, and the difference between the two (patch). However, because bugs are to be localized at the function and line level rather than the file level, additional preprocessing is performed to extract the code changes at the function level. Lizard is used to extract the functions and compare the different between the functions from the before and after version of a source file (obtained from Pydriller).

Thus, two datasets of different types and languages are built: one is for single-line bug-fixes in Java (SL-Java) and the other is the multi-lines bug-fixes in Python (ML-Python). For SL-Java, be-side the code changes for bug fixes, tree-sitter is used to identify 13 bug patterns for the single buggy lines. However, the patterns are useful in analysing how well the debugging framework 100 works on each pattern, providing a deeper understanding of the debugging process.

Table 1 in FIG. 6 shows the statistics of the two newly built datasets, which have been split into training, validation, testing sets. For function-level bug detection task, the whole code snippet is used. The buggy or non-buggy label is decided by simply treating the be-fore version as the buggy (label 0) and the after version as non-buggy (label 1). For line-level bug localization task, the buggy line's number information to train the model to localize which line is buggy. For program repair, the before version is used as the source input and the after version is used as the target sequence.

The debugging framework 100 may employ the CodeT5-base (220M) as the foundation model (denoted as "CodeT5-DLR"). Three variants are also considered, e.g., CodeT5-D trained with only $L_{detect}$, CodeT5-L trained only with $L_{localize}$, and CodeT5-R only trained with $L_{repair}$. The maximum source and target sequence lengths are set to 512. All experiments are performed on NVIDIA A100 GPUs (e.g., processor 210 in FIG. 2) with 40 GB memory.

Table 2 in FIG. 7 shows example performance of function-level bug detection of the debugging framework 100 (CodeT5-DLR) comparing with baseline models. Specifically, for the task of function-level bug detection, two metrics are used: the F1 score and the False Positive Rate (FPR). F1 is the standard metric for this type of task because it is a binary classification problem (buggy or not). The FPR, on the other hand, is critical for determining a bug localization system's usability in a real-world scenario. A good bug detection system should pro-duce as few false positives as possible. FPR is calculated as the ratio between the number of non-buggy func-tions wrongly categorized as buggy (false positives) and the total number of actual non-buggy functions.

The function-level bug detection can be viewed as the code classification task, i.e, assign a la-bel to a given code snippet. Thus, baseline models include Tree-based CNN (see Mou et al., in proceedings of Convolutional neural networks over tree structures for programming language processing, in proceedings of AAAI conference on artificial intelligence, 2016), which is a well-known method for code classification as a baseline. Other SOTA pretrained language models of code are also included for comparison, including Code-BERT (Feng et al., Code-BERT: A pre-trained model for programming and natural languages, in Findings of the Association for Computational Linguistics: EMNLP 2020, pages 1536-1547, 2020), GraphCodeBERT (Guo et al., Graphcode-BERT: Pre-training code representations with data flow, arXiv preprint arXiv:2009.08366, 2020), and PLBART (Ahmad et al., Unified Pre-training for Program Understanding and Generation, in Proceedings of the 2021 Conference of the North American Chapter of the Associa-tion for Computational Linguistics: Human Language Tech-nologies, NAACL HLT 2021, pages 2655-2668, 2021). The public checkpoints of these baselines may be used and are fine-tuned for this task. Additional baseline includes Spot-Bugs, a widely used static analysis-based baseline (see Karampatsis et al.; Habib et al., How many of all bugs do we find? a study of static bug detectors, in 2018 33rd IEEE/ACM International Conference on Automated Software Engineering (ASE), pages 317-328, 2018) for bug detection task. For CodeT5, three variants are studied: CodeT5-L, CodeT5-D and CodeT5-DLR. CodeT5-R is not trained for bug detection but its output can also be used to detect bug.

As shown in FIG. 7, the debugging framework 100 fine-tuned with all 3 objectives together achieves the best performance in terms of both F1 score and FPR, while CodeT5-D with the only function-level bug detection objec-tive still yields better results than the baselines.

Table 3 in FIG. 8 shows example performance of line-level bug localization of the debugging framework 100 (CodeT5-DLR) comparing with baseline models. For this specific task, 3 metrics are used, including Mean Reciprocal Rank (MRR), Mean Average Precision (MAP), and False Positive Rate (FPR). In practice, the debugging framework 100 often does not know how many lines of code is buggy, so the top-k lines with the highest scores are retrieved and measured if the ground-truth buggy lines(s) belong to these top-k lines. As such, this problem may be reformulated as an information retrieval problem, with the goal of returning a ranked list of relevant lines to a query (the query is to retrieve all of the buggy lines among the lines). For this reason, the metrics of MRR and MAP to evaluate for this buggy line retrieval task. In the evaluation settings, each of these metrics will be appropriate for a different dataset. For the SL-Java, because there is only one buggy line in the ground truth, the MRR is appropriate for evaluating the performance of this dataset. On the other hand, each of sample in ML-Python contains numerous buggy lines in the ground truth, the MAP is better suited for ML-Python. With this, MRR and MAP are computed with respect to k, resulting in MRR@k and MAP@k, where k is number of lines retrieved for evaluation. For example, k=1 and k=5 are chosen for evaluation.

In addition to MRR and MAP, False Positive Rate (FPR) is used to evaluate. Given a code snippet and retrieved buggy lines, the FPR in this case is calculated as the ratio between the number of non-buggy lines wrongly categorized as buggy (false positives) and the total number of actual non-buggy lines. FPR is also computed with respected to top-k lines retrieved, similar to MRR and MAP.

Baselines are chosen which are similar to the function-level bug localization task, including CodeBERT, GraphCodeBERT and PLBART. In addition, two baselines that have been used to detect vulnerability in software engineering are used, which are DeepLineDP (Pornprasit et al., Deeplinedp: Towards a deep learning approach for line-level defect prediction. IEEE Transactions on Software Engineering, 2022) and LineVul (Fu et al., LineVul: A Transformer-based Line-Level Vulnerability Prediction, in Proceedings of the International Conference on Mining Software Repositories (MSR), 2022). These baselines work by simply performing prediction at the function level, then using attention scores from the backbone neural architecture to retrieve the line scores to predict vulnerability at line level. DeepLineDP is based on the Hierrarchical Attention Network which divides the source code into three layers: function, line, and token, with each level processed by a BiGRU neural network. LineVul is based on a vanilla Transformer and its scores are calculated by averaging the token scores from the multi head attention layer. It is noted that DeepLineDP and LineVul have not been used for bug localization before.

As shown in FIG. 8, CodeT5-DLR outperforms all base-lines in terms of all metrics. The FPR is low when the model only aims to detect one line of buggy code. When increasing k to 5, the FPR increases. However, the MRR and MAP are also better for either single-line bug detection (SL-Java) or multi-line bug detection (ML-Python) with k=5. It means that as we broaden the scope of buggy line retrieval, the number of correctly detected bugs increases, but the model produces more false alarms. When performing bug local-ization at the line level, this is a tradeoff that can hardly be avoided.

Figures 9, 10:
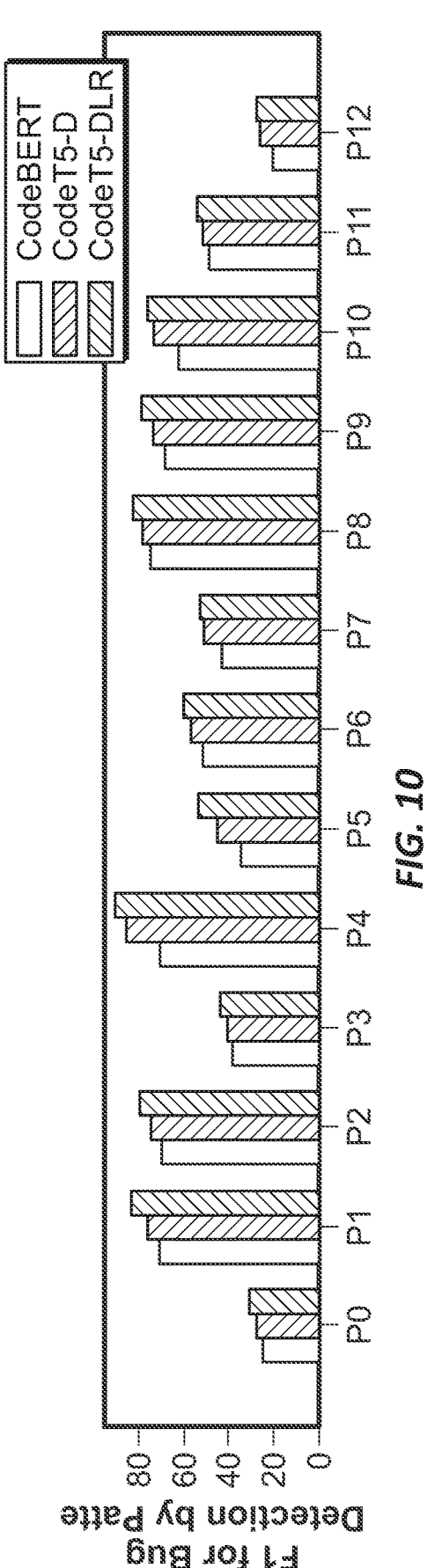
FIG. 9 is a table showing example performance of program repair of the debugging framework comparing with baseline models, according to some embodiments described herein.
FIG. 10 is a data chart showing example performance comparison between the debugging framework, broken down by different bug patterns, according to embodiments described herein.

Table 4 in FIG. 9 shows the example performance of program repair of the debugging framework 100 (CodeT5-DLR) comparing with baseline models. 2 metrics are used for program repair: Exact Match (EM) and BLEU. For EM, if the generated program exactly matches the ground truth correct program, then EM=1, otherwise EM=0. BLEU score is a standard metric that is usually used to measure translation-based tasks.

Baselines include CodeBERT, GraphCodeBERT, and PLBART for the program repair task. These pretrained models are pretrained with the $L_{repair}$ objective to generate the fixed code from buggy code.

As shown in FIG. 9, CodeT5-DLR achieves the best performance among the baselines with significant margins, both in terms of EM and BLEU. In overall, EM for ML-Python is lower than EM for SL-Java, it is because that it is more challenging to generate fixed code given that there are multi buggy lines in the buggy code.

FIG. 10 shows example performance comparison between the debugging framework 100 in F1 scores, broken down by different bug patterns. The SL-Java dataset contains bug pattern information, analyzing and understanding how different bug patterns can be detected and fixed is critical for future debugging system improvement. The performance is broken down by bug-pattern and computer the percentage of successfully detected bugs for each of the patterns in terms of F1 score based on the results of function-level bug detection in FIG. 7. 3 baselines are used for this analysis, which are: CodeBert, CodeT5-L. and CodeT5-DLR. As shown in FIG. 10, CodeT5-L may perform better than CodeT5-DLR on an average of 4.1%, and is better than CodeBERT on an average of 10.2% in terms of F1. For some patterns, such as P1 (change operand), P2 (change identifier) and P5 (change caller in function), CodeT5-DLR perform much better than CoderBERT (>14% on average).

Figure 11:
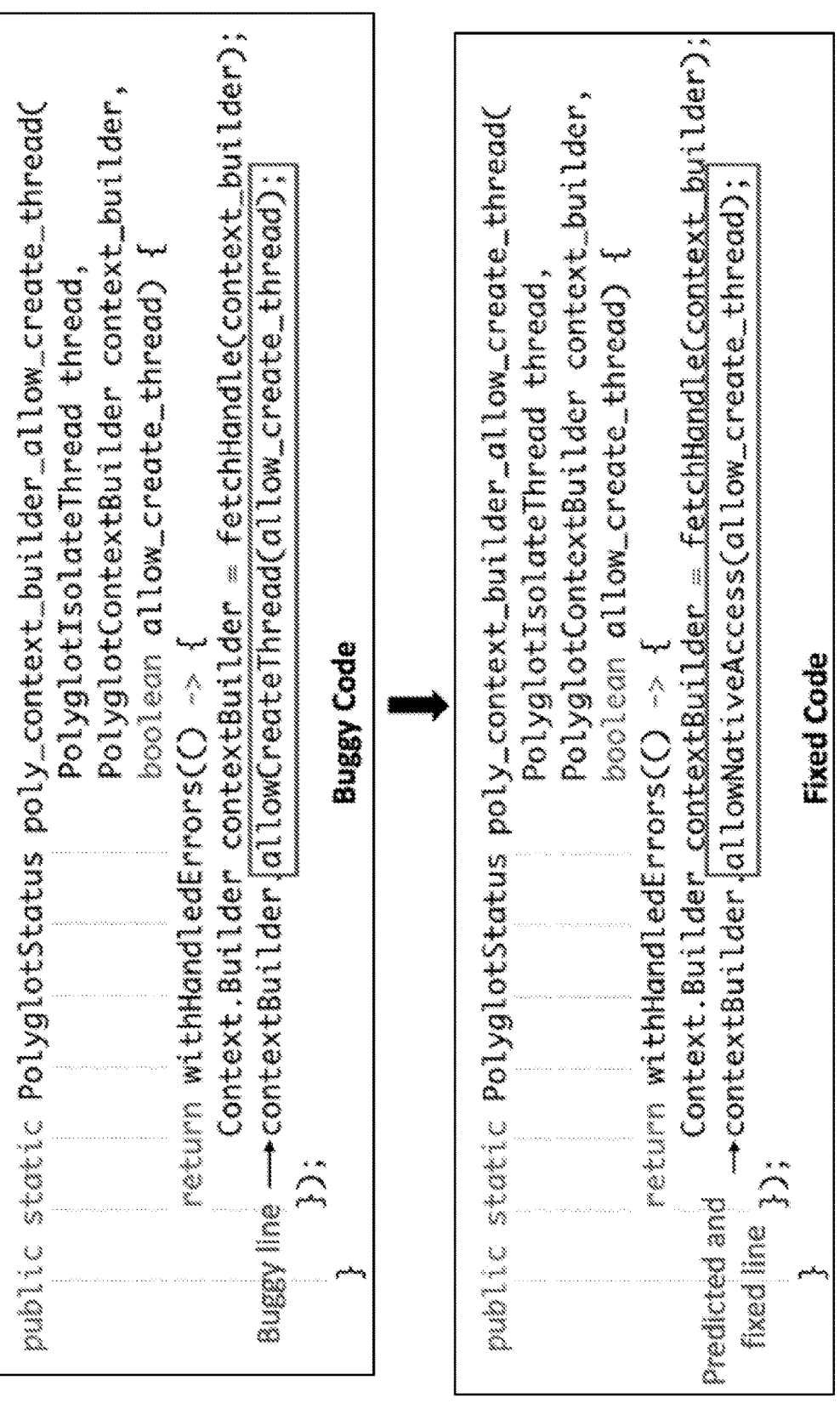
FIG. 11 is a debugging example for a CHANGE_CALLER_IN_FUNCTION bug that CodeT5_DLR successfully detects and repairs, according to some embodiments described herein.

FIG. 11 shows a debugging example for a CHANGE_CALLER_IN_FUNCTION bug that CodeT5_DLR successfully detects and repairs. Additional data experiments have shown the full capability of CodeT5-DLR model in a unified manner, i.e., both detect bugs and suggest fixes. It also reflects how the developer debugs program in their daily work. First, the function-level bug detection module is used to predict a set of buggy functions from the test set, regardless of whether they are buggy or not. Then, using the detected samples, the line-level bug localization module is used to identify buggy lines within these detected samples (not all samples in the test set). The program repair module is then used to suggest fixes for these samples as w ell.

As shown in FIG. 11, a bug example that CodeT5-DLR can detect, localize and repair. Note that this is a real example from an open source project 8 with 17K stars on Github. This is a real bug-fix commit with the commit message "Minor fix in polyglot native API". First, the function-level bug detection model can detect that this is a buggy line. Second, the line-level bug localization model ranks the line context Builder. allowNativeAccess (allow_create_thread); as the top-1 line that is buggy. Finally, the program repair module translates the whole buggy function to the fixed function, and the buggy part "allowCreateThread" is translated to the correct version "allowNativeAccess". This fix could be referred to the CHANGE_CALLER_IN_FUNCTION pattern, in which the invoked function of an object is changed.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method of training a debugging network, the method comprising:

receiving, via a data interface, a training dataset comprising a source program patch that includes a plurality of lines with a special token at an end of each line, a set of labels indicating line-level bugs in the source program patch and a target program patch;

generating, by an encoder of a pretrained language model, a first predicted probability that the source program patch contains any bug conditioned on the source program patch, the first predicted probability corresponding to a binary classification indicating whether the source program patch contains a bug or no bug;

computing a first training objective based on the first predicted probability and a ground-truth;

mapping, by the encoder, last layer states of special tokens of the plurality of lines to a vector of predicted probabilities, each of the predicted probabilities indicating a respective line in the source program patch containing any bug conditioned on the source program patch;

generating, by the encoder, the vector of predicted probabilities;

computing a second training objective based on the vector of predicted probabilities and the set of labels;

generating, by the encoder and a decoder of the pretrained language model, tokens for a fixed program conditioned on the source program patch;

computing a third training objective based on the tokens for the fixed program and the target program patch;

training the pretrained language model based on at least in part on the first training objective, the second training objective, and the third training objective;

repairing an input program code snippet by (i) determining a line of the input program code snippet contains a bug, (ii) generating, by the trained pretrained language model, a fixed code patch corresponding to the line containing the bug in response to the input program code snippet, and (iii) replacing the line using the fixed code patch.

2. The method of claim 1, wherein the first predicted probability is generated based on a last encoder state of the encoder.

3. The method of claim 1, further comprising:

applying a linear layer on the first predicted probability for a binary classification; and determining the source program patch contains at least one bug when the first predicted probability is greater than a pre-defined threshold.

4. The method of claim 1, wherein the vector of predicted probabilities are generated based on last layer states of all special tokens inserted into the source program patch in the encoder.

5. The method of claim 1, further comprising:

selecting a subset of lines having highest predicted probabilities among the vector of predicted probabilities as containing at least one bug.

6. The method of claim 1, wherein the tokens for the fixed program are generated as a sequence to sequence generation based on an input sequence of tokens in the source program patch.

7. The method of claim 6, further comprising:

generating, via beam search, a ranked list of fixed candidate patches from a decoder output distribution; and selecting a top ranked fixed candidate patch as an output fixed program.

8. The method of claim 1, wherein the pretrained language model is updated based on a sum of the first training objective, the second training objective, and the third training objective.

9. The method of claim 1, wherein the pretrained language model is updated based on at least one of, or a sum of any two of the first, the second and the third training objectives.

10. A system of training a debugging network, the system comprising:

a data interface that receives a training dataset comprising a source program patch that includes a plurality of lines with a special token at an end of each line, a set of labels indicating line-level bugs in the source program patch and a target program patch;

a memory storing a pretrained language model comprising an encoder and a decoder, and a plurality of processor-executable instructions; and a processor reading and executing the plurality of processor-executable instructions to perform operations comprising:

generating, by the encoder, a first predicted probability that the source program patch contains any bug conditioned on the source program patch, the first predicted probability corresponding to a binary classification indicating whether the source program patch contains a bug or no bug;

computing a first training objective based on the first predicted probability and a ground-truth;

mapping, by the encoder, last layer states of special tokens of the plurality of lines to a vector of predicted probabilities, each of the predicted probabilities indicating a respective line in the source program patch containing any bug conditioned on the source program patch;

generating, by the encoder, the vector of predicted probabilities;

computing a second training objective based on the vector of predicted probabilities and the set of labels;

generating, by the encoder and the decoder, tokens for a fixed program conditioned on the source program patch;

computing a third training objective based on the tokens for the fixed program and the target program patch;

training the pretrained language model based on at least in part on the first training objective, the second training objective, and the third training objective;

repairing an input program code snippet by (i) determining a line of the input program code snippet contains a bug, (ii) generating, by the trained pretrained language model, a fixed code patch corresponding to the line containing the bug in response to the input program code snippet, and (iii) replacing the line using the fixed code patch.

11. The system of claim 10, wherein the first predicted probability is generated based on a last encoder state of the encoder.

12. The system of claim 10, wherein the operations further comprise:

applying a linear layer on the first predicted probability for a binary classification; and determining the source program patch contains at least one bug when the first predicted probability is greater than a pre-defined threshold.

13. The system of claim 10, wherein the vector of predicted probabilities are generated based on last layer states of all special tokens inserted into the source program patch in the encoder.

14. The system of claim 10, wherein the operations further comprise:

selecting a subset of lines having highest predicted probabilities among the vector of predicted probabilities as containing at least one bug.

15. The system of claim 10, wherein the tokens for the fixed program are generated as a sequence to sequence generation based on an input sequence of tokens in the source program patch.

16. The system of claim 15, wherein the operations further comprise:

generating, via beam search, a ranked list of fixed candidate patches from a decoder output distribution; and selecting a top ranked fixed candidate patch as an output fixed program.

17. The system of claim 10, wherein the pretrained language model is updated based on a sum of the first, the second and the third training objectives.

18. The system of claim 10, wherein the pretrained language model is updated based on at least one of, or a sum of any two of the first training objective, the second training objective, and the third training objective.

19. A non-transitory processor-readable storage medium storing a plurality of processor-executable instructions for training a debugging network, the instructions being executed by a processor to perform operations comprising:

a data interface that receives a training dataset comprising a source program patch that includes a plurality of lines with a special token at an end of each line, a set of labels indicating line-level bugs in the source program patch and a target program patch;

a memory storing a pretrained language model comprising an encoder and a decoder, and a plurality of processor-executable instructions; and a processor reading and executing the plurality of processor-executable instructions to perform operations comprising:

generating, by the encoder, a first predicted probability that the source program patch contains any bug conditioned on the source program patch, the first predicted probability corresponds to a binary classification indicating whether the source program patch contains a bug or no bug;

computing a first training objective based on the first predicted probability and a ground-truth;

mapping, by the encoder, last layer states of special tokens of the plurality of lines to a vector of predicted probabilities, each of the predicted probabilities indicating a respective line in the source program patch containing any bug conditioned on the source program patch;

generating, by the encoder, the vector of predicted probabilities;

computing a second training objective based on the vector of predicted probabilities and the set of labels;

generating, by the encoder and the decoder, tokens for a fixed program conditioned on the source program patch;

computing a third training objective based on the tokens for the fixed program and the target program patch;

training the pretrained language model based on at least in part on the first training objective, the second training objective, and the third training objective;

repairing an input program code snippet by (i) determining a line of the input program code snippet contains a bug, (ii) generating, by the trained pretrained language model, a fixed code patch corresponding to the line containing the bug in response to the input program code snippet, and (iii) replacing the line using the fixed code patch.

20. The non-transitory processor-readable storage medium of claim 19, wherein the pretrained language model is updated based on:

a sum of the first, the second and the third training objectives; or at least one of, or a sum of any two of the first, the second and the third training objectives.

* * * * *